US008140364B2

(12) United States Patent
Kannan et al.

(10) Patent No.: US 8,140,364 B2
(45) Date of Patent: Mar. 20, 2012

(54) METHOD AND SYSTEM FOR THE BUNDLING AND PRICING OF WIRELESS HOTSPOTS

(75) Inventors: Ramakrishnan Kannan, Bangalore (IN); Karthik Subbian, Croton on Hudson, NY (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 12/015,299

(22) Filed: Jan. 16, 2008

(65) Prior Publication Data
US 2009/0182599 A1 Jul. 16, 2009

(51) Int. Cl.
G06Q 10/00 (2006.01)
H04W 24/00 (2009.01)
H04W 4/00 (2009.01)
G06F 15/173 (2006.01)

(52) U.S. Cl. ............... 705/7.11; 705/1.1; 455/456.1; 370/328; 709/223

(58) Field of Classification Search .................. 705/1.1, 705/7.11; 455/456.1; 370/328; 709/223
See application file for complete search history.

(56) References Cited

U.S. PATENT DOCUMENTS

| 6,038,554 | A | 3/2000 | Vig |
| 6,226,625 | B1 | 5/2001 | Levenstein |
| 7,552,095 | B2 | 6/2009 | Kalyan |
| 2004/0052223 | A1* | 3/2004 | Karaoguz et al. ............. 370/328 |
| 2004/0152472 | A1* | 8/2004 | Ono et al. ................... 455/456.1 |
| 2004/0158480 | A1* | 8/2004 | Lubars et al. ..................... 705/1 |
| 2004/0225620 | A1 | 11/2004 | Faustino et al. |
| 2006/0030293 | A1* | 2/2006 | Karaoguz et al. ............. 455/408 |
| 2006/0265491 | A1* | 11/2006 | Litwin ......................... 709/224 |
| 2007/0112948 | A1* | 5/2007 | Uhlik ........................... 709/223 |
| 2007/0242657 | A1* | 10/2007 | Waisman-Diamond ...... 370/352 |
| 2008/0086356 | A1* | 4/2008 | Glassman et al. .............. 705/10 |
| 2008/0263632 | A1 | 10/2008 | Keon |
| 2008/0270222 | A1 | 10/2008 | Goel |
| 2009/0059863 | A1* | 3/2009 | Chen et al. .................... 370/331 |
| 2009/0141695 | A1* | 6/2009 | Karaoguz et al. ............. 370/338 |
| 2010/0085895 | A1* | 4/2010 | Bajko ........................... 370/254 |
| 2010/0128667 | A1* | 5/2010 | Russell ......................... 370/328 |

OTHER PUBLICATIONS

Markendahl, Jan et al., "Analysis of Business Models and Market Players for Local Wireless Internet Access", Jun. 14-15, 2007, IEEE.*
Shin, Seungjae et al., "Optimal Pricing for Broadbrand Wireless Internet Access Service", 2005, IEEE.*
Battiti, Roberto et al., "Price-based Congestion-Control in Wi-Fi Hot Spots", Proceedings of WiOpt'03 Sophia-Antipolis, France (Mar. 3-5, 2003).*
"T-Mobile's Wireless Division", Nov. 10, 2004, eWeek, Ziff Davis Media, Inc, pp. 1-2.*
Amelio, Andrea, "Charging Models in the Open Broadbrand Access Market—Theory and Practice", 2006, pp. 1-7.*
Mahler, Alwin et al., "The Evolving Hot Spot Market for Broadband Access", Oct. 25, 2005.*

(Continued)

*Primary Examiner* — Fadey Jabr
(74) *Attorney, Agent, or Firm* — McGinn IP Law Group, PLLC (57) ABSTRACT

A method (and structure) for providing services for wireless hotspots. The services are offered to selectively include bundled hotspots as well as single hotspots.

19 Claims, 7 Drawing Sheets

(Original image from maps.fon.com)

OTHER PUBLICATIONS

*Department of Computer Science, University College London—* Technical Research Note No. RN/05/08. "Challenges, Opportunities and Incentives for Coalition-Based Community Networking", Authors: Manish Lad, Saleem Bhatti, and Peter Kirstein.

J. Sole-Pareta et al. (Eds.): QofIS 2004, LNCS 3266, pp. 348-357, 2004. "BarterRoam: A Novel Mobile and Wireless Roaming Settlement Model", Authors: Eng Keong Lua, Alex Lin, Jon Crowcroft, and Valerie Tan.

Proceedings of the Second Annual International Conference on Mobile and Ubiquitous Systems: Networking and Services (MobiQuitous '05), Department of Computer Science, University of Illinois at Urbana-Champaign, "Market Models and Pricing Mechanisms in a Multihop Wireless Hotspot Network", Authors: Kai Chen, et al.

Hanson, Ward, "The Dynamics of Cost-Plus Pricing", Mar.-Apr. 1992, Managerial and Decision Economics, vol. 13, No. 2, pp. 149-161.

\* cited by examiner

METHOD AND SYSTEM FOR THE BUNDLING AND PRICING OF WIRELESS HOTSPOTS

BACKGROUND OF THE INVENTION

1. Field of the Invention

The present invention generally relates to wireless Internet and particularly to Wireless Community Networks (WCNs). More specifically, bundled hotspots are offered to users in a WCN by a model that provides multi-day bundles and multi-day groupings of single hotspots in a manner that gives equitable allocations of revenue from the bundles to the bundle participants, as well as allowing hotspot and hotspot bundle prices to depend on the speed of the connection/capacity of the router, which may in turn depend on the usage level of the router.

2. Description of the Related Art

Wireless Internet accessibility has been gaining popularity since its inception. Today, big stores to small shops offer wireless Internet connectivity for their customers through 802.11 Wireless LAN Technology. Shops or venues that offer such facility for a customer or a visitor who can use a laptop, WiFi Phone, or other suitable portable device to access the internet are called "wireless hotspots" (or synonymously hotspots).

Figure 1:
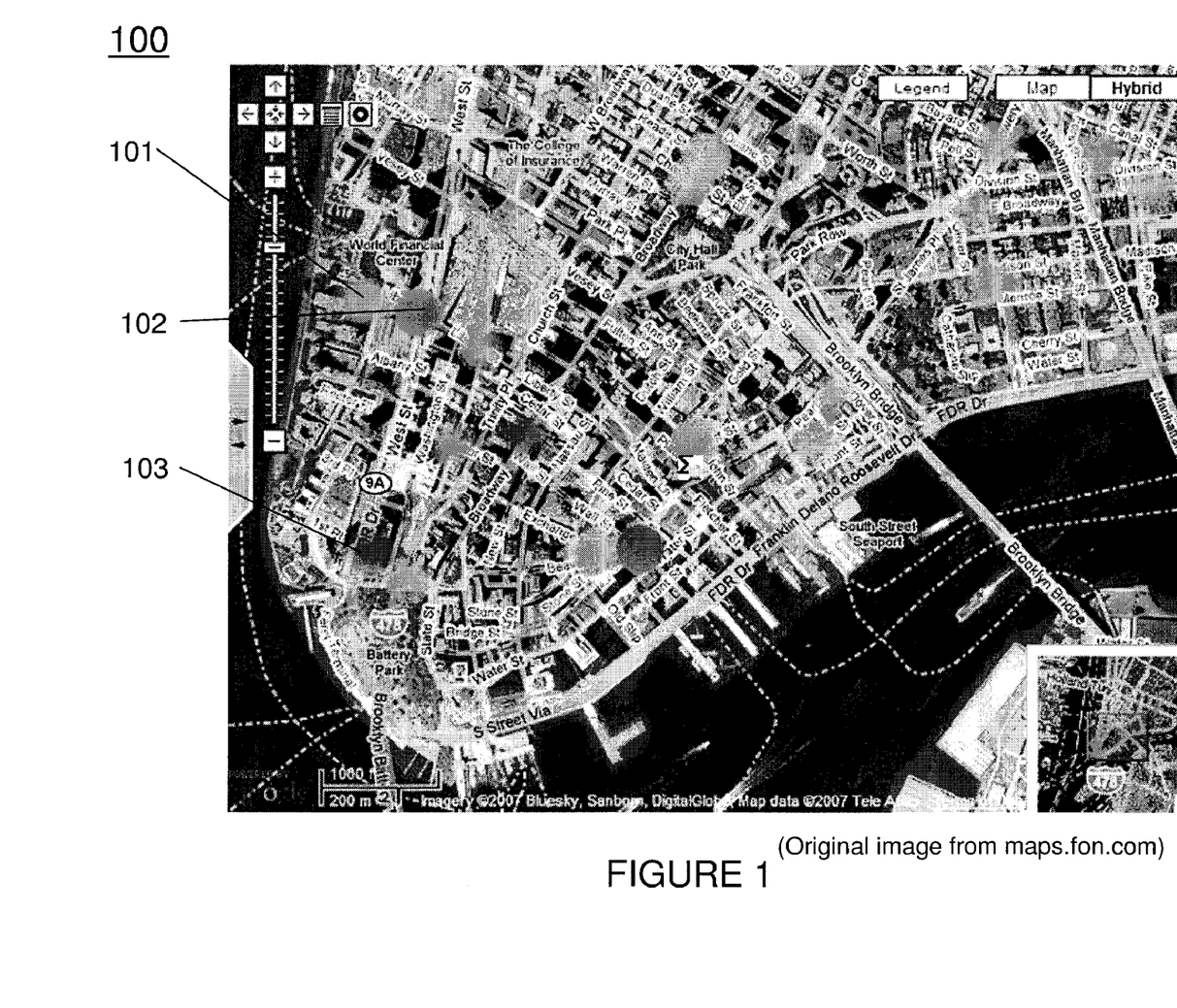
FIG. 1 exemplarily shows a map 100 of hotspots in a New York City Manhattan.

FIG. 1 exemplarily shows a map 100 of available hotspots (e.g., 101, 102, 103) in New York City Manhattan.

There are two categories of hotspots: free hotspots, wherein any visitor to this hotspot can access internet free of charge using a WiFi device; and, paid hotspots, wherein any visitor to this hotspot has to pay through credit card or bank accounts or third party services (e.g., Paypal®) to access internet. Access charges are generally flat for 24 hrs. Some places also have hourly charges. The present invention addresses the category involving paid use of hotspots.

More particularly, the present invention addresses the paid use of so-called Wireless Community Networks (WCNs), which are groupings of individuals of which some have a router that is connected to the internet. Through the use of specialized software on the router, other individuals may connect to the router-owner's router and use some of that individual's bandwidth to connect to the internet. While there are some efforts to have free WCN, there is a growing community that subscribes to a paid service which organizes and provides additional services to the WCN.

Thus, a Wireless Community Network (WCN) is an organization of individuals that group together to have wider access to internet hotspots. WCN enables even individuals to become hotspot providers through the use of specialized routers and software that enables other individuals to access their routers. As mentioned, in some cases, this is a benevolent or free service, such as provided to a group of friends or members of an organization. In other cases, it is operated by a for-profit company, wherein the company sells the routers and software to the individuals so that, when a "visitor" accesses one of the individuals' routers seeking an access point to the internet, the company charges a usage fee. The owner of the router gets a fraction (such as 50%) of the usage fee while the company gets the rest.

A limitation of the technology used in these instances is that, each time a "visitor" accesses such a hotspot, the user is required to pay a new usage fee, most likely getting the service from a different router owner. In urban areas, where this technology is most developed and most appropriate, a user may wish to access more than one such hotspot and a new payment each time is both cumbersome and excessive. This is particularly true with handheld devices used, for example, while an individual is walking.

The paradigm is as follows: when a visitor arrives in the vicinity of a router using the specialized software, he/she is presented with the possibility to log on, for a fee, to one of the hotspots. Once the fee is paid, the user may access the internet from the prescribed point. Later, the fee is shared 50%-50% between the WCN organizing company and the router owner.

An important point to remember is that Internet Service Provider, in some cases, act as WCN Company, but a non-Internet-Service-Providing Company may also act as a WCN organization. There are many companies that are currently pursuing such business model. One such WCN organizing company is FON (e.g., see www.fon.com).

The problem being addressed by the present invention is that each customer visits a hotspot and pays for the Internet access on a per-day or per-hour basis. Customers must therefore pay for multiple locations, even if they are closely located. This prohibits the customer from moving around a geographic center. In particular, if a user is on a handheld device and wishes to move in a larger geographic area than that covered by the particular hotspot, he/she may need to pay two or more times for the single usage session, even if the hotspots are closely located. This aspect, of course, prohibits a customer from freely moving around a geographic center without having to pay multiple user fees.

Use of revenue sharing in WCN is growing, with companies such as FON receiving backing from Skype and Google. However, the paradigm is limited for the above reason, and because the revenue sharing as practiced today does not support bundled offerings of independently-owned routers. Clearly, that is an impediment to further growth of the paid WCN paradigm. In particular, the revenue sharing approach as practiced today does not support bundled offerings of independently owned routers.

Thus a need exists for improving the capabilities of WCN services.

SUMMARY OF THE INVENTION

In view of the foregoing, and other, exemplary problems, drawbacks, and disadvantages of the conventional systems, it is an exemplary feature of the present invention to provide a structure (and method) in which WCN users can use more than one hot spot for a lesser price than the total individual price for each hotspot in the bundle.

It is another an exemplary feature of the present invention to provide a structure and method for benefiting WCNs to potentially make more profit than usual, due to the capability for bundling of hotspots.

In a first exemplary aspect of the present invention, to achieve the above results, described herein is a method of providing services for wireless hotspots, including offering said services to selectively include bundled hotspots as well as single hotspots.

In second and third exemplary aspects, also described herein are apparatuses and machine-readable media having incorporated thereon a sequence of machine-readable instructions for executing the method of providing bundled hotspots.

Thus, the present invention provides a method and system for offering bundled hotspots to users in a WCN and includes a means for setting up the service or extending an existing WCN organization to include bundled offerings. The present invention also provides the algorithms for pricing the single and bundled usage of hotspots. These algorithms include parameters for determining the remuneration of hotspot owners in each bundle in such a manner that it is advantageous for each owner to participate in the bundle and offer the service.

BRIEF DESCRIPTION OF THE DRAWINGS

The foregoing and other purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-7, an exemplary embodiment will now be described.

The present invention solves the above-described problem for WCNs by providing a new business model, suggesting a system flow to describe how the new business model may be implemented, and then offering two new programs, called Model 1 and Model 2, for ensuring that the new business model is effective and sustainable. Specifically, the present invention adds a pricing program to determine efficient and good prices potentially based on current conditions for both individual and bundles use of hotspots. This is referred to as Model 1.

In parallel, the present invention teaches using notions from cooperative game theory to ensure that each hotspot owner participating in the bundle is better off by participation. An exemplary embodiment of such a method for this context is referred to as Model 2.

In summary, the overall scheme works as follows. First, the user logs onto the system and selects a geographic center, or else through his or her location, a geographic center is identified. Then, a map is presented to the user centered at that geographic center and displaying the available hotspot locations within some radius of the center. Next, the user is provided with choices: one choice is the time period desired: for example 1-day usage, 2-day usage, 3-day usage, etc. Another choice is which locations interest the user, from 1 to some threshold, such as 3 or 4. The user may click on the locations and choice of time period. Then, the prices for each individual hotpot use for that time period are displayed along with the prices for the possible bundles of those 3 or 4 hotspots. This is done through a model called Model 1. Once the user completes the transaction, he or she may use the internet during the prescribed period at those locations.

Next, on a different time frame, the owners of the routers whose hotspots are used are compensated. The compensation is determined through the use of Model 2, which determines a fair and incentive-compatible sharing of the revenues to bundle participants.

System Flow—Steps

Figure 2:
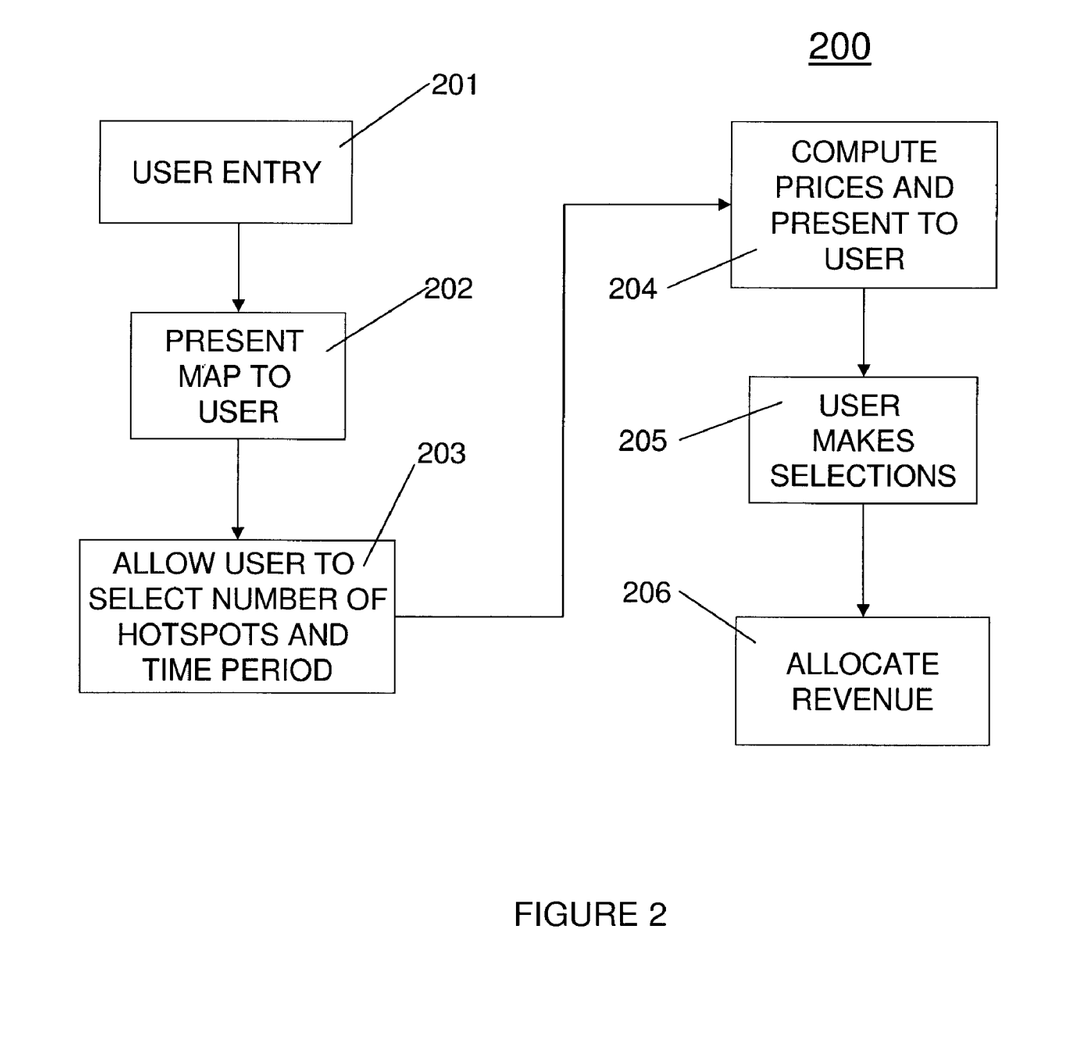
FIG. 2 exemplarily shows a flowchart 200 of the system flow in the pricing and revenue allocation in bundled wireless hotspots of the present invention.
Figure 3:
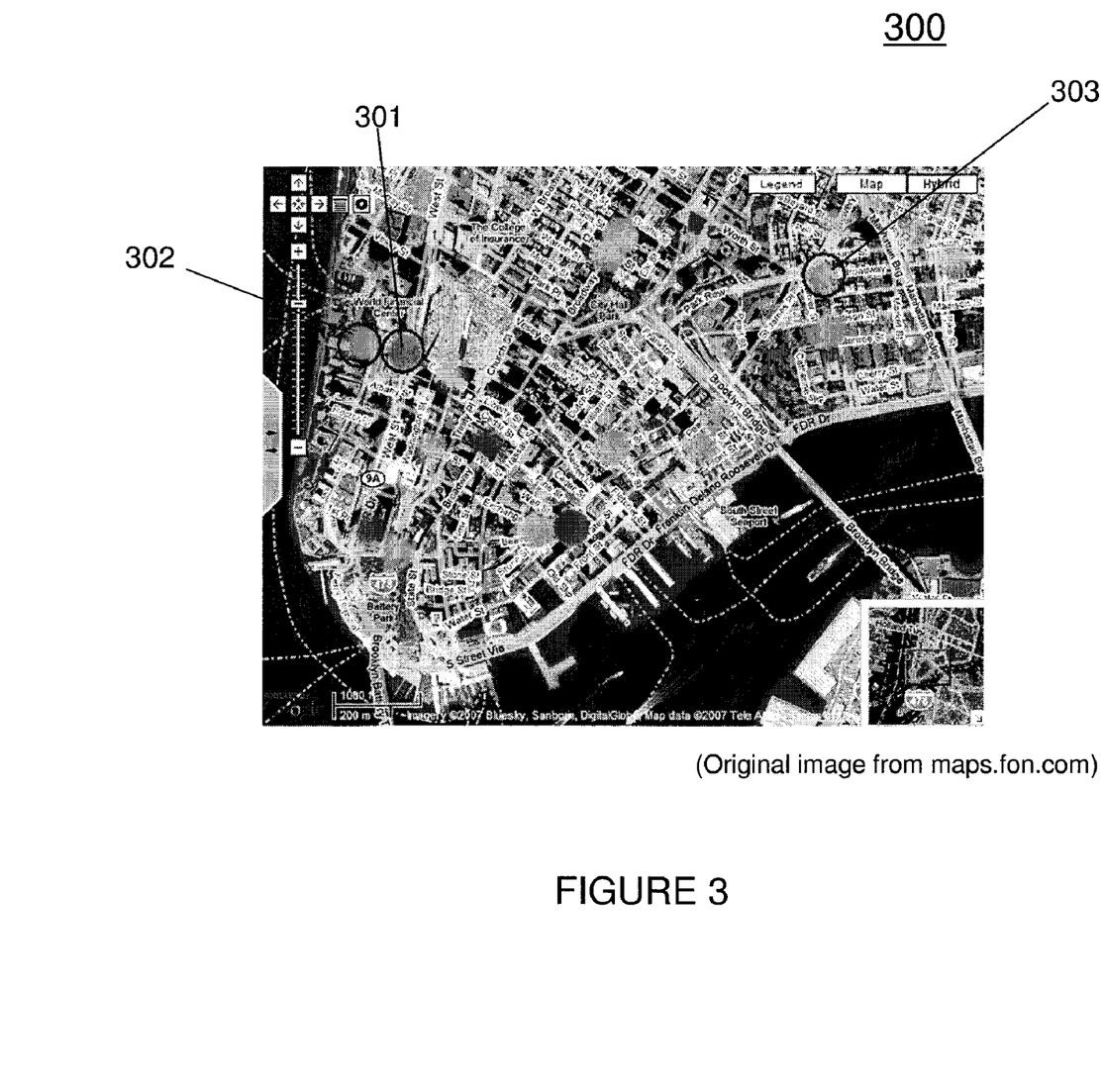
FIG. 3 exemplarily shows selection 300 by a user of up to n (e.g., n=3) hotspots of interest within the radius.
Figure 4:
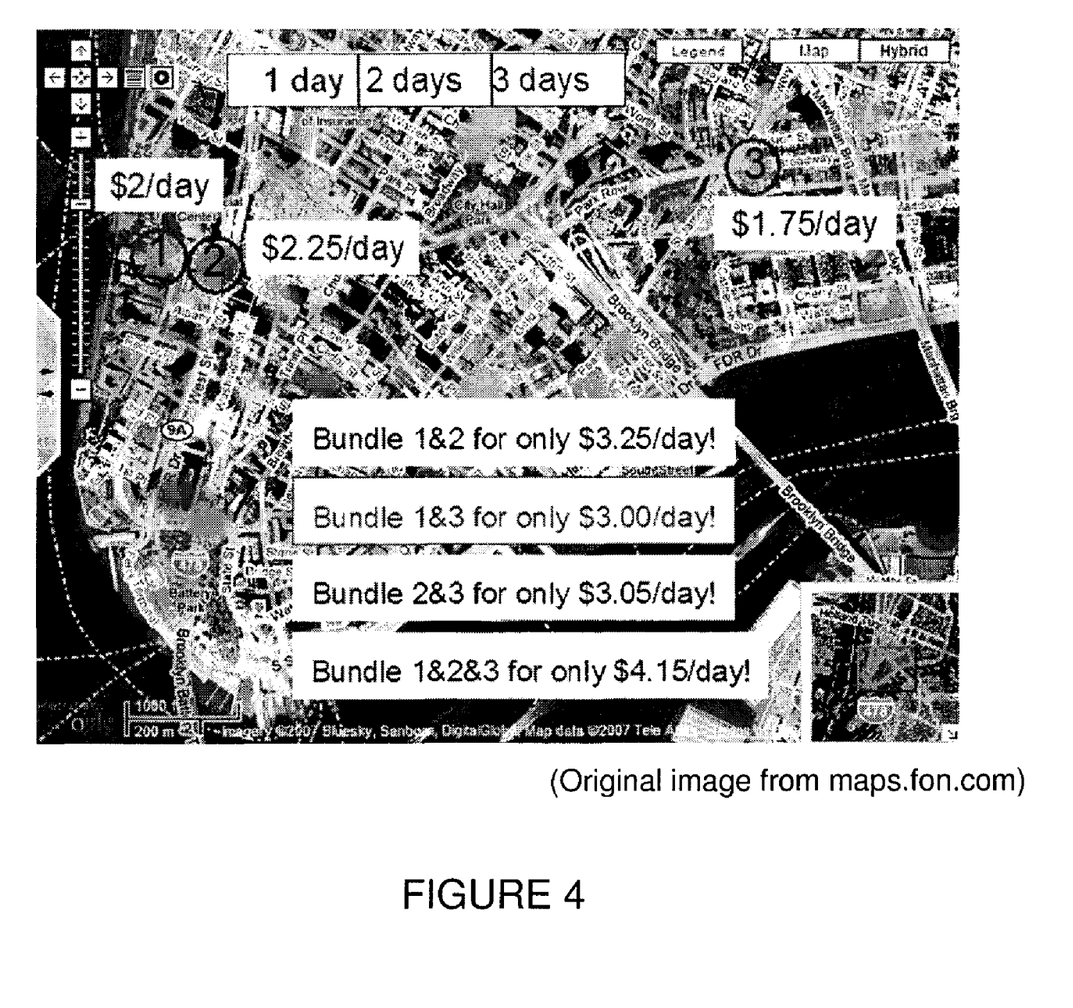
FIG. 4 exemplarily shows a user screen presentation 400 of calculated optimal prices for a single hotspot/bundled hotspots of up to n hotspots within chosen time periods.

FIG. 2 exemplarily shows the system flow 200 in the pricing and revenue allocation in bundled wireless hotspots.

In an initiation step 201, either a user enters a hotspot or geographic center or the user searches for available hotspot in a given area, based on some geographic center provided by the user. In step 202, the system presents a map with nearby hotspot within some radius of geographic center and, in step 203, allows the user to select up to n (e.g., n=3) hotspots of interest within the radius, as illustrated on the map 300 exemplarily shown in FIG. 3.

In step 204, optimal prices are computed for a single hotspot and for bundled hotspots of up to n hotspots within a chosen time period t (e.g., t=one day, two days or three days of hotspot use), as further explained below for Model 1.

In step 205, the user is presented with prices for individual hotspot use for the chosen time period and is allowed to select desired bundle. The user selects and pays (or agrees to pay) immediately.

In step 206, allocation of revenue from hotspot use to hotspot owners at end of reference period, s (e.g., s=1 day, 1 week, or 1 month) is computed, based on summation of usage*prices for all bundles and single hotspot use.

Detailed Exemplary Embodiments of Models 1 and 2

As briefly described above, the present invention teaches two different models. Model 1 is used to determine the optimal prices for hotspot bundles, and Model 2 is used to determine the optimal sharing of hotspot revenue among hotspot owners.

Model 1: Determine the Optimal Prices for Hotspot Bundles

Model 1 should provide a set of prices for the use of the single hotspots selected by the user as well as the prices for the bundles of hotspots from that set selected by the user. Some or all possible bundles may be presented.

In one exemplary embodiment, the selection of the hotspots by the user may trigger a program which calculates prices for the single and bundled hotspot use. The program may take as input the usage requests for the hotspots in question in the period of time preceding the current request. It may also take into account the current usage levels of the hotspots in question.

The program may also classify users into user classes, where a user class may be deduced or selected by the user. Some possible examples of user classes include: tourist, business traveler, student, employee, homemaker, etc. It is expected that different user classes have different preferences for the attributes of the hotspots and bundles of hotspots. These can be modeled and represented in the program which determines the prices.

The program may also incorporate other aspects of the usage of each hotspot or bundle of hotspots, such as the speed of the connection, or average speed of the bundled connections, and the location of the hotspots. Location may be converted to a location-index, which rates locations as to their convenience or popularity. These location-indices may be computed ahead of time or when the user selects the hotspots in question. Hence, an element of the Model 1 may be a utility function representing the utility of each hotspot and bundle of hotspots.

An embodiment of such a utility function is $$U_{kh}^t = v_{kh} - \alpha_k * r_h^t + \beta_k * loc_h + \gamma_k speed_h \forall k=1 \ldots K, \forall h = 1 \ldots N, t \in \{1,\{1,2\},\{1,2,3\}\}$$

In this example, t is a time period, k represents a user class, and h represents the hotspot or bundle of hotspots in question. The Greek letters represent the weight of the attributes to that user class for that hotspot/bundle during that time period of reference. The variable r represents the price, loc represents the location-index, speed represents a quality-of-service of the hotspot or bundle of hotspots. In the case of the bundle, it may be the average quality level. The values of the weights can be calibrated by examining user behavior in the past or estimated in an ad hoc manner.

For the prices to be incentive-compatible, it is desirable that the total revenue that a bundle, c, is able to achieve is at least as large as the sum of the revenue that the individual hotspots would achieve without bundling. This is likely to be achieved through the additional users that are attracted to the bundle itself.

In other words, the likelihood of joining the WCN is higher if a bundle option is available. In this way, it is not necessary that the price of the bundle is higher than the sum of the prices of the individual hotspot use. It is likely to be the contrary. The incentive compatibility constraint is as follows:

$$r_c p_c(r_c) d \leq \sum_{i \in c} r_i p_i(r_i) d, \forall c \subseteq N$$

The likelihood of users to choose a particular hotspot when faced with its price and characteristics or a particular bundle of hotspots may be represented by a discrete-choice probability function such as the one below, where the 0'th option represents the choice of not participating in the WCN, such as the price of a competitor or simply of leaving the system:

$$p_{kh}^t = \frac{e^{\theta U_{kh}^t(r_h^t)}}{e^{\theta U_{h0}^t} + \sum_{t'=1}^{T} \sum_{h'=1}^{N} e^{\theta U_{kh'}^{t'}(r_{kh'}^{t'})}} \quad \forall h = 1 \ldots N, t \in \{1,\{1,2\},\{1,2,3\}\}$$

Putting these constraints together along with a revenue-maximization objective for the overall set of hotspots and bundles leads to an exemplary embodiment such as the one below:

$$\max_{r \geq 0} \sum_{k=1 \ldots K} \sum_{h=1 \ldots N} r_h p_h^k(r_h) d_k$$

Determine prices that maximize total revenue Subject to $$r_c p_c(r_c) d \geq \sum_{i \in c} r_i p_i(r_i) d, \forall c \subseteq N$$

Coalitional/Individual Rationality Constraint $$U_{kh}^t = v_{kh} - \alpha_k * r_h^t + \beta_k * loc_h + \gamma_k speed_h \forall k=1 \ldots K, \forall h = 1 \ldots N, t \in \{1,\{1,2\},\{1,2,3\}\}$$

Utility of each user class for each hotspot or bundle of hotspots $$p_{kh}^t = \frac{e^{\theta U_{kh}^t(r_h^t)}}{e^{\theta U_{h0}^t} + \sum_{t'=1}^{T} \sum_{h'=1}^{N} e^{\theta U_{kh'}^{t'}(r_{kh'}^{t'})}} \quad \forall h = 1 \ldots N, t \in \{1,\{1,2\}, \{1,2,3\}\}$$

Discrete choice probability function

The output of the program from Model 1 is a set of prices for the desired time period(s) and for the individual and bundles use of the selected hotspots.

Model 2: Determine the Optimal Sharing of Hotspot Revenue Among Hotspot Owners

The earned revenue from single and bundled hotspots is shared using the Shapley Value Division mechanism, further described in Lloyd S. Shapley (*A Value for n-person Games*, in "*Contributions to the Theory of Games*", volume II, by H. W. Kuhn and A. W. Tucker, eds., Annals of Mathematical Studies v. 28, pp. 307-317. Princeton University Press), which reference is hereby incorporated herein by reference.

The idea behind Shapley Value Division is to find the marginal contribution of each hotspot owner in every bundle of hotspots. Each order of arrangement of players will yield different amount of marginal contribution to each player in that order. By averaging the marginal contribution across all such order of arrangements, we get the average marginal contribution of each hotspot in that geographical area.

An important property that the Shapley value brings is that players who do not contribute to any coalition get zero revenue. Players who are geographically popular (and key players) will get higher share of revenue than players who are not. By changing the unit of currency or to any virtual currency, the mechanism retains its properties. By this we mean the mechanism exhibits linearity. The mechanism exhibits symmetry, meaning players are permuted in any order or arrangement, and the mechanism always reveals the same outcome.

Notation

N={1, ..., n} set of all hotspots owners in a geography, where the computation is performed.

v(.)=The characteristic function of the game. This function returns the sum of revenue earned $r_C$ by the hotspot coalition C (or bundle) in the subject geography for the specified time window. Formally, $$v: 2^C \to r_C, \forall C \subseteq N$$

(N, v)=Characteristic Form Game or Transferable Utility (TU) Game $\phi = (\phi_1, \phi_2, \ldots, \phi_n)$=Revenue Allocation Vector for TU Game (N, v)

We define the revenue share of hotspot h, $$\phi_h(C, v) = \sum_{\substack{k \subseteq N \\ i \in k}} \left\{ \frac{(|c| - |k| - 1)!}{|c|!} \right\} [v(k \cup \{i\}) - v(\{i\})]$$

This solution satisfies symmetry, linearity and carrier axioms as proposed by Shapley. As the proposed game is convex, the Shapley division is shown to lie in core of the game, in such condition, we can directly claim the fact that there is no sub-coalition of hotspots that could have obtained more payoff (that is, revenue) through any other coalition, without being worse off to any player (Coalitional Rationality).

This also ensures that bundling would always either increase or retain at least as much remuneration as they would have obtained without bundling (Individual rationality) for every hotspot owner and participating in bundles is always motivating for every individual.

Exemplary Hardware Implementation

Figure 5:
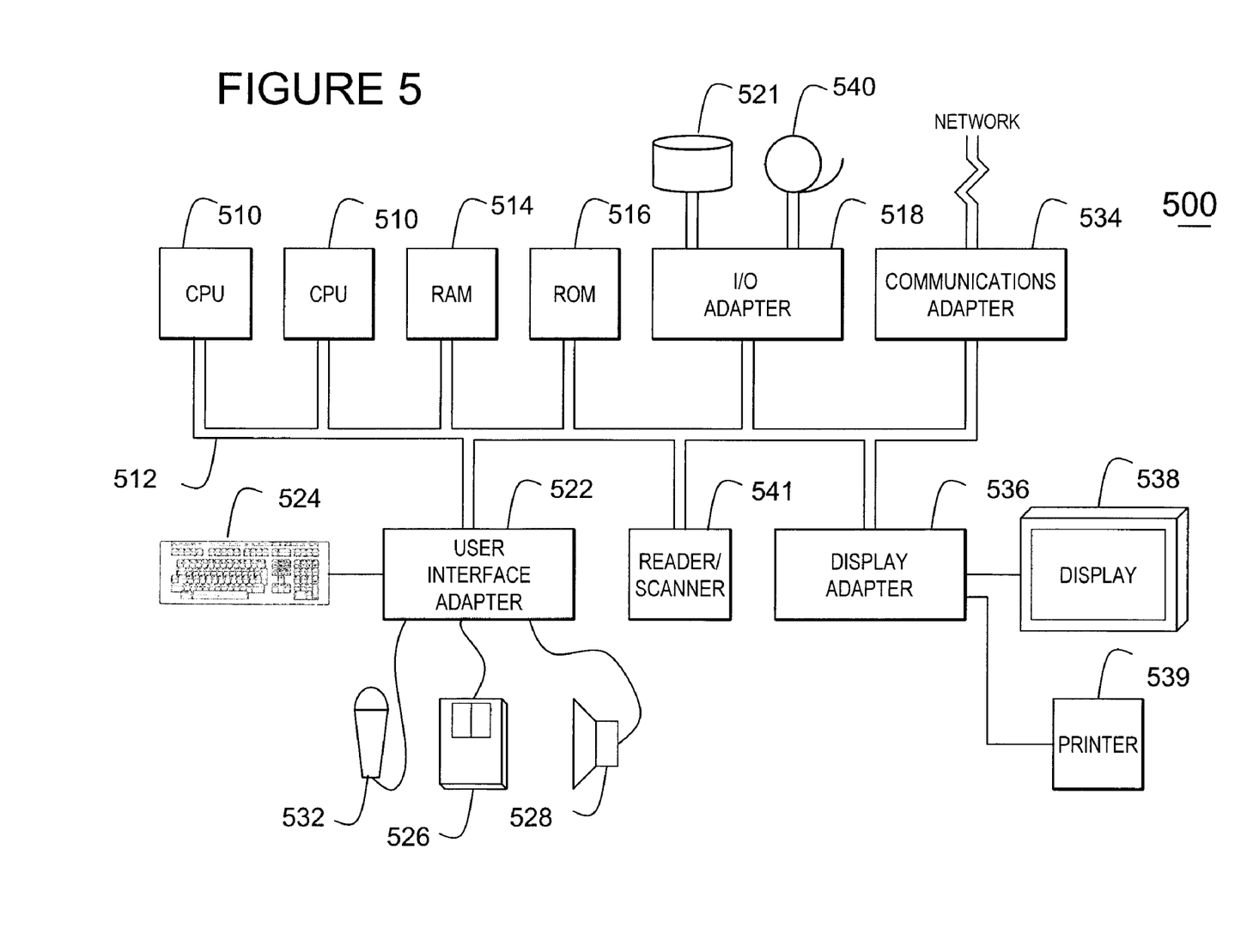
FIG. 5 illustrates an exemplary hardware/information handling system 500 for incorporating the present invention therein.

FIG. 5 illustrates a typical hardware configuration of an information handling/computer system in accordance with the invention and which has at least one processor or central processing unit (CPU) 511. The program that implements the present invention would typically be located in server side (e.g., where the server would be owned and managed by the WCN service provider) of a network capable of supporting WCNs. The client will use a browser (IE, Mozilla) or a custom application (Like Google earth) or OCX control (Like Activex controls) to interact with the server side code. Typically, it would not be mandatory to have the client side code pre-installed in the case of use of a browser.

As shown in FIG. 5, the CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Figure 6:
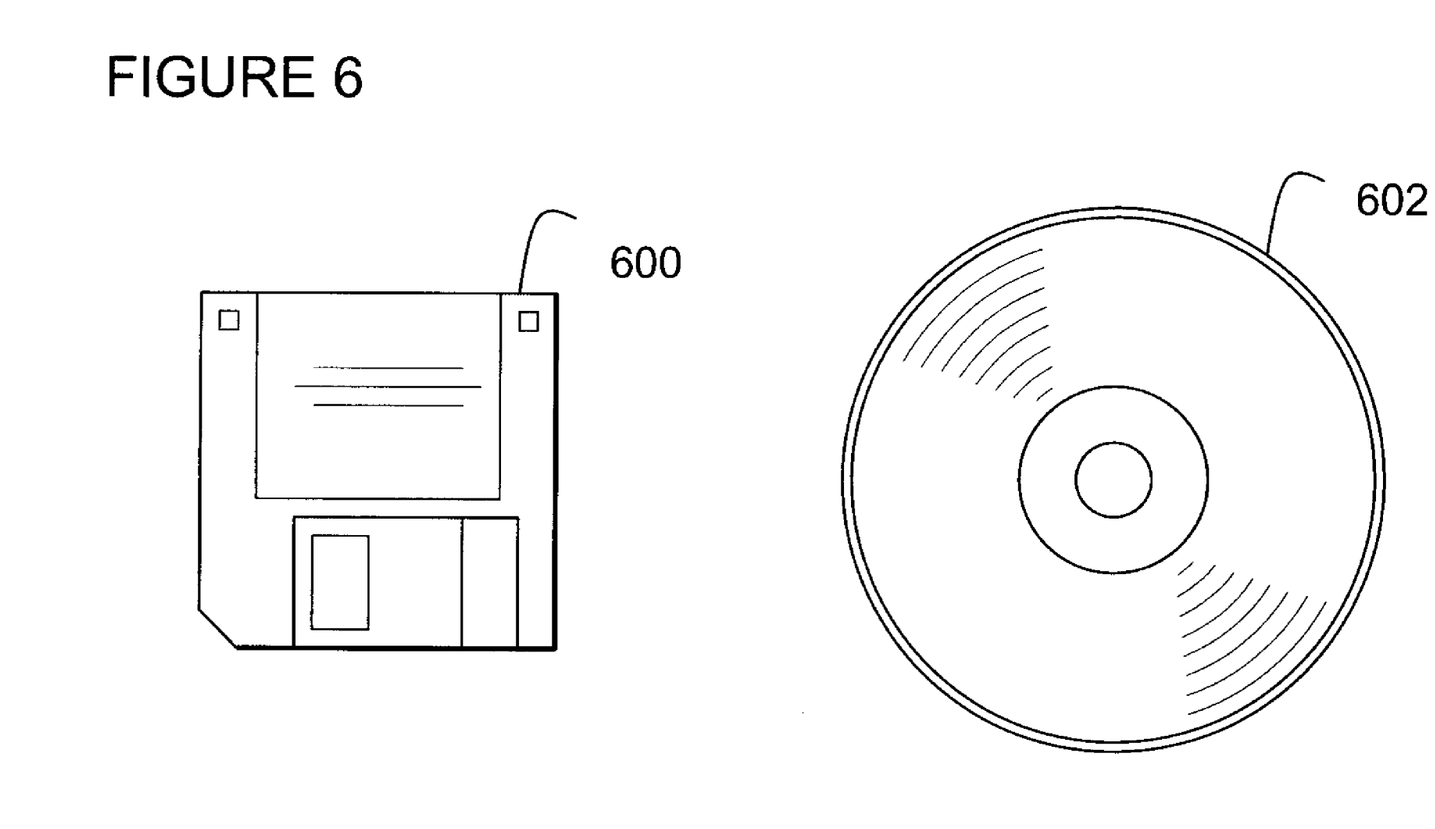
FIG. 6 illustrates a signal bearing medium 600 (e.g., storage medium) for storing steps of a program of a method according to the present invention.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

Exemplary Software Implementation

Figure 7:
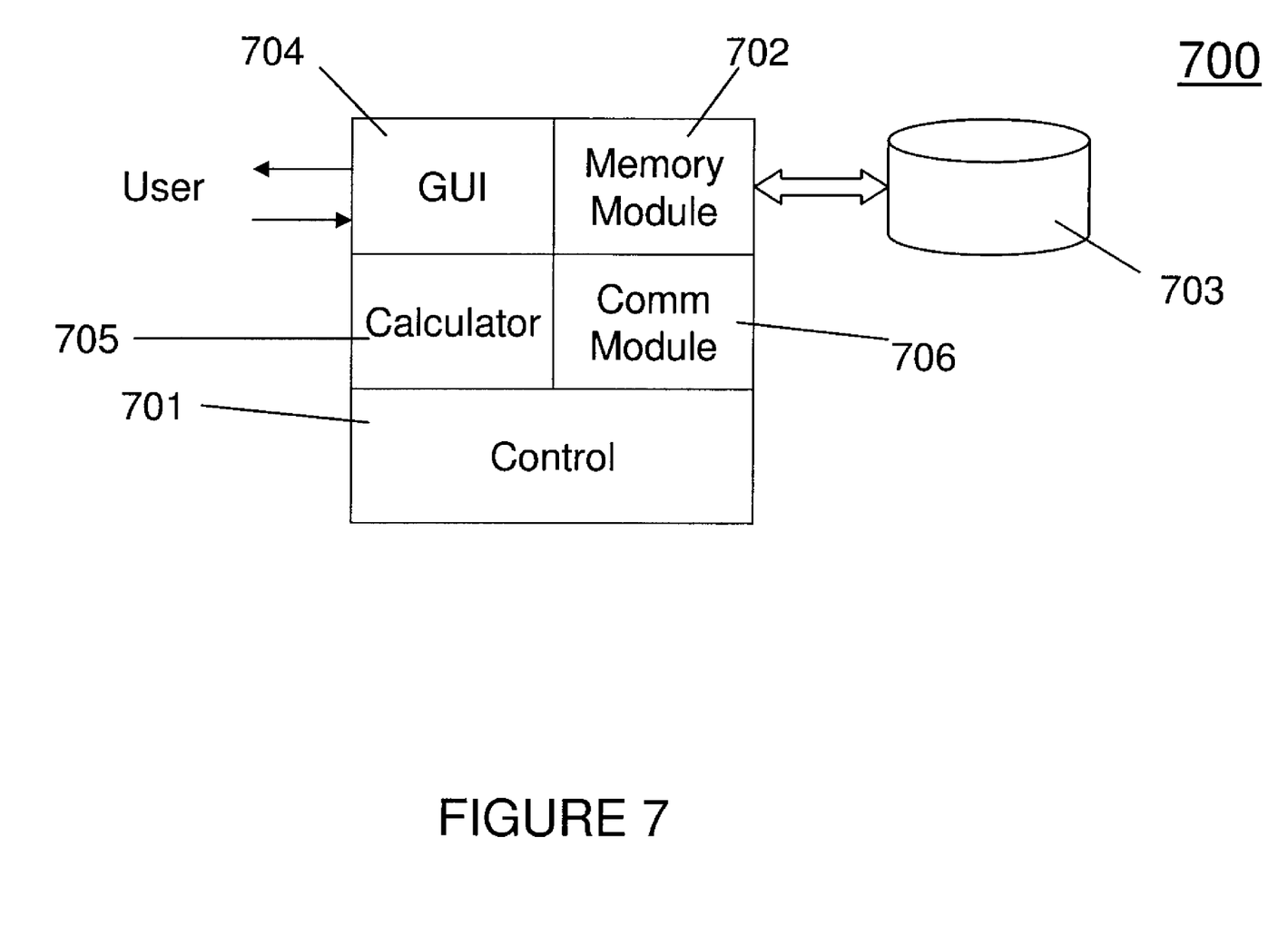
FIG. 7 illustrates a block diagram 700 of an application program that implements the concepts of the present invention.

FIG. 7 shows an exemplary block diagram 700 of the software module that would typically be installed in the WCN server to implement the present invention. The software module 700 would typically comprise a subroutine embedded in the existing server programs providing WCN service or could be a stand alone application program that is invoked as appropriate to service a user request. Control module 701 would comprise the main program that invokes the various submodules (e.g., subroutines) as necessary. Thus, submodule 702 interfaces with memory 703 that contains the information on the hotspots, including the parameters discussed above. Graphical user interface 704 permits user interface relative to server functions, including permitting a WCN service provider user to enter data on the hotspots of that WCN. Calculator module 705 performs the mathematical calculations described above and communications module 706 permits an interface with the server function so that results of the calculations can be transmitted to the customer interested in entering into an agreement for a bundle of hotspots, as well as receive the responses from the hotspot user.

The present invention provides a method and system for offering bundled hotspots to users in a WCN, as well as offering a method for determining optimal prices of the bundled hotspots belonging to members of a WCN. The invention also offers a method for determining equitable allocations of revenue from the bundles to the bundle participants. The invention offers a method for determining multi-day bundles and multi-day groupings of single hotspots. The invention offers a method for allowing hotspot and hotspot bundle prices to depend on the speed of the connection/capacity of the router, which may in turn depend on the usage level of the router.

Although the exemplary embodiment described above explains the method of the present invention, it is understood that variations are possible and intended as covered by the claims that follow. For example, although Shapley mechanisms are described as an exemplary precise allocation mechanism, the present invention is not intended as limited to this mechanism since other mechanisms are also possible. As described in the discussion above, advantages of the Shapley mechanisms include the linearity, carrier, symmetry axioms, as well as being coalitionally rational (CR). Other methods are possible, particularly if the other method guarantees CR and other rationality properties.

Another possible variation is that of coupling free and paid sites. For instance, a user could get a bundle of free sites and additional sites (bundled or individual at a price or prices). The free sites can be used as an incentive to attract users to the WCN program. The mathematics explained above would be only slightly modified so that prices are determined for those that are priced and there is no price for the free sites in the bundle.

Other possible variations include the time period of the offerings of bundled services, since it should be clear that any reasonable time period could be used, as based upon specific user scenarios, including offerings based on any one of hours, days, etc., as appropriate for the expected usage of specific hotspots.

Thus, while the invention has been described in terms of a single exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of providing services for wireless hotspots, said method comprising:
   receiving a request from a user relative to wireless hotspot service in a geographic area; and offering, using a processor on a computer, said services to selectively include bundled hotspot services in said geographic area, each hotspot service bundle including hotspots of different hotspot owners in said geographic area and being priced as a bundle of hotspots rather than single hotspot prices, as well as single hotspot services with single hotspot prices, said offering said services further comprising:

presenting a map of said geographic area to said user, said map displaying available hotspot locations in said geographic area; and presenting pricing information concerning said available hotspot locations, including any hotspot services available as bundled hotspot service.

2. The method of claim 1, wherein said services are provided through a use of Wireless Community Networks (WCN).

3. The method of claim 1, wherein said services comprise services with prices offered to users, said method further comprising:

determining optimal prices of the bundled hotspots.

4. The method of claim 3, further comprising:

determining equitable allocations of revenues from the bundles of bundled hotspots to bundle participants.

5. The method of claim 3, wherein said services comprise services with prices offered to users, said prices being determined in accordance with a utility function representing a utility of each hotspot and bundle of hotspots, said utility function comprising $$U_{kh}^t = v_{kh} - \alpha_k * r_h^t + \beta_k * loc_h + \gamma_k speed_h^t \forall k=1 \ldots K, \forall h=1 \ldots N, t \in \{1, \{1,2\}, \{1,2,3\}\}$$

where t is a time period, k represents a user class, and h represents the hotspot or bundle of hotspots in question, v, α, β and γ respectively represents a weight of attributes to that user class for that hotspot/bundle during that time period of reference, r represents a price, loc represents a location-index, and speed represents a quality-of-service of the hotspot or bundle of hotspots.

6. The method of claim 3, wherein said optimal prices of services of said hotspots comprise a set of prices for a desired time period and individual and bundled use of selected hotspots, in accordance with a calculation of:

$$\max_{r \geq 0} \sum_{k=1 \ldots K} \sum_{h=1 \ldots N} r_h p_h^k(r_h) d_k$$

Determine prices that maximize total revenue,

Subject to:

$$r_c p_c(r_c) d \geq \sum_{i \in c} r_i p_i(r_i) d, \forall c \subseteq N$$

(Coalitional/Individual Rationality Constraint);

$$U_{kh}^t = v_{kh} - \alpha_k * r_h^t + \beta_k * loc_h + \gamma_k speed_h^t$$

$$\forall k = 1 \ldots K, \forall h = 1 \ldots N, t \in \{1, \{1, 2\}, \{1, 2, 3\}\}$$

(Utility of each user class for each hotspot or bundle of hotspots); and $$p_{kh}^t = \frac{e^{\theta U_{kh}^t(r_h^t)}}{e^{\theta U_{h0}^t} + \sum_{t'=1}^{T} \sum_{h'=1}^{N} e^{\theta U_{kh'}^{t'}(r_{kh'}^{t'})}} \forall h = 1 \ldots N, t \in \{1, \{1, 2\}, \{1, 2, 3\}\}$$

(Discrete choice probability function).

7. The method of claim 1, further comprising:

determining multi-day bundles and multi-day groupings of single hotspots.

8. The method of claim 1, further comprising:

determining prices for said bundled hotspots, said prices allowing hotspot and hotspot bundle prices to depend on a speed of a connection/capacity of a router.

9. The method of claim 1, wherein earned revenues of said bundled hotspots are shared using a mechanism in accordance with a Shapley Value Division.

10. The method of claim 9, wherein said mechanism for calculating said earned revenues comprises a calculation of revenues of hotspots as:

$$\varphi_h(C, v) = \sum_{\substack{k \subseteq N \\ i \in k}} \left\{ \frac{(|c| - |k| - 1)!}{|c|!} \right\} \cdot [v(k \cup \{i\}) - v(\{i\})]$$

where:

N={1, . . . , n} set of all hotspots owners in a geography where the computation is performed;

v (.)=a characteristic function of a game, said characteristic function returning a sum of revenue earned $r_c$, by a hotspot coalition C (or bundle) in the subject geography for the specified time window, formally, $$v: 2^C \to r_C, \forall C \subseteq N$$

(N, v)=Characteristic Form Game or Transferable Utility (TU) Game; and

φ=(φ$_1$, φ$_2$, . . . , φ$_n$)=Revenue Allocation Vector for TU Game (N,v).

11. The method of claim 1, as executed as a sequence of machine-readable steps on a processor of a server interacting with a user terminal capable of interacting with said hotspots, said method further comprising:

transmitting information of said offering of bundled hotspot services to allow said user to respond to said offering.

12. The method of claim 1, as executed on a processor of a user terminal, having been downloaded as an application program on said user terminal.

13. An apparatus, comprising:

a memory tangibly storing a sequence of machine-readable instructions defining steps to provide services for wireless hotspots in a specified geographic area, said steps offering said services to selectively include bundled hotspots as well as single hotspots, said bundled hotspots comprising at least one bundle of services from different hotspot owners in said specified geographic area, said at least one bundle being priced as a bundle rather than prices for separate hotspot services, said steps further defining steps to receive a request from a user, present a map of said geographic area to said user upon receiving said request, said map displaying available hotspot locations in said geographic area, and said steps further defining steps to present pricing information concerning said available hotspot locations, including any hotspot services available as bundled hotspot service; and a processor to execute said machine-readable instructions.

14. The apparatus of claim 13, as comprising a server that provides to users the hotspot services, said processor at least one of:

transmits said machine-readable instructions upon request, so that a user can use a user terminal to receive and selectively execute said sequence of machine-readable instructions and respond to said offering; and executes said sequence of machine-readable steps and transmits said offering to said user.

15. The apparatus of claim 13, as comprising a user terminal capable of interfacing with said hotspots, wherein said processor executes instructions for a user interfacing with a server, to view a map and select hotspot service available in said geographic area, said apparatus further comprising:

a display to permit said user to view said offering; and an interface to allow said user to select at least one of said bundled hotspot services or said single hotspot services.

16. The apparatus of claim 13, wherein said services comprise services with prices offered to users, said apparatus further comprising a calculator for:

determining optimal prices of the bundled hotspots; and determining equitable allocations of revenues from the bundles of bundled hotspots to bundle participants.

17. The apparatus of claim 13, wherein said calculator further at least one of:

determines multi-day bundles and multi-day groupings of single hotspots; and determines prices for said bundled hotspots, said prices allowing hotspot and hotspot bundle prices to depend on a speed of a connection/capacity of a router.

18. A non-transitory computer-readable storage medium tangibly embodying a program of machine-readable instructions executable by a digital processing apparatus to perform steps of a method of providing services for wireless hotspots in a given geographic area, said method comprising:

offering said services to selectively include bundled hotspots as well as single hotspots in said geographic area, said services for bundled hotspots comprising at least one bundle of services from different hotspot owners in said geographic area, wherein said offering said services further comprises, upon receiving a request from a user, presenting a map of said geographic area to said user, said map displaying available hotspot locations in said geographic area and presenting to said user pricing information concerning said available hotspot locations, including any hotspot services available as bundled hotspot service.

19. The computer-readable medium of claim 18, comprising at least one of machine-readable instructions:

stored on a hard drive of a computer serving as a server on a network providing said service;

stored on a memory of said server computer as instructions being currently executed by said server computer;

stored on a memory of a user terminal as potentially permitting said user to execute said method as a user of said services;

stored on a memory of a user terminal currently executing said method as a user of said services; and stored on a stand alone diskette of computer-executable instructions to be inserted into a drive of a computer so that said instructions can be loaded onto said computer.

* * * * *